Feb. 21, 1967     L. J. HOV     3,304,587

ELECTRON BEAM OVERFLOW MELTING METHOD AND MEANS

Filed May 18, 1964     2 Sheets-Sheet 1

INVENTOR.
LOREN J. HOV
BY
townsend and townsend
ATTORNEYS

Feb. 21, 1967   L. J. HOV   3,304,587
ELECTRON BEAM OVERFLOW MELTING METHOD AND MEANS
Filed May 18, 1964   2 Sheets-Sheet 2
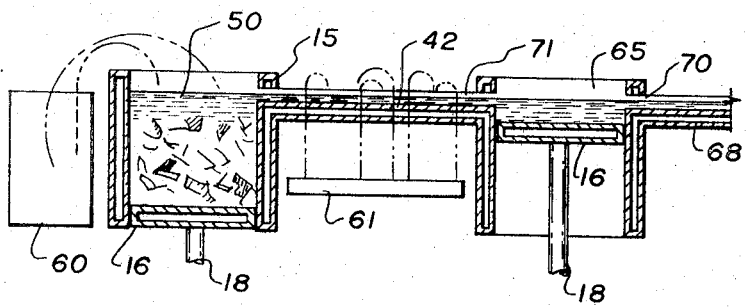
FIG. 4
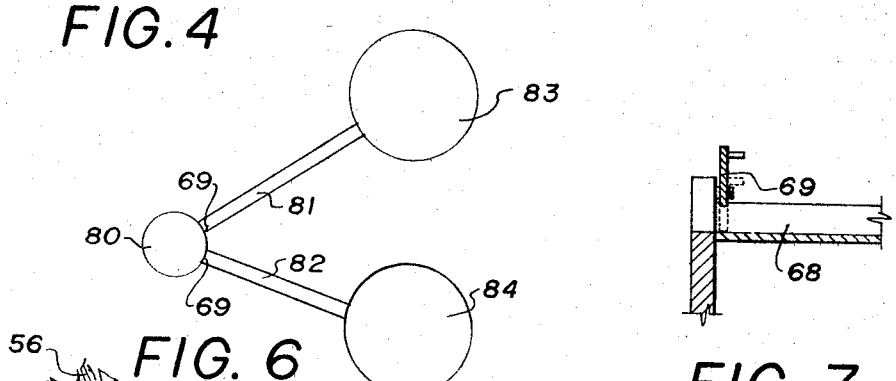
FIG. 6
FIG. 7
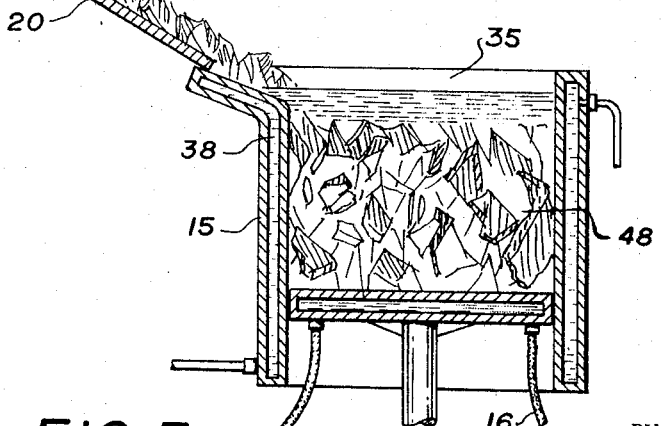
FIG. 5
INVENTOR.
LOREN J. HOV
BY
townsend and townsend
ATTORNEYS

United States Patent Office 3,304,587
Patented Feb. 21, 1967

3,304,587
ELECTRON BEAM OVERFLOW MELTING
METHOD AND MEANS
Loren J. Hov, Chappaqua, N.Y.
(380 Madison Ave., New York, N.Y. 10017)
Filed May 18, 1964, Ser. No. 367,356
9 Claims. (Cl. 22—73)

This invention relates to a method of and means for electron beam melting and casting of metals.

It is necessary to employ high temperatures and in an atmosphere of high vacuum to allow the more volatile impurities in metals to evaporate. In accomplishing these results the current practice is to purify the metal by heating it in either an arc or electron beam furnace with sufficient surface exposure of the molten metal being maintained to allow the impurities to escape and evaporate from the melt.

In the electron beam type furnace a melt is formed by establishing a positive potential to the melt and employing an electron beam gun remote from the melt which will establish an electron beam flow of sufficient power to generate the metal melting heat. The vacuum which allows for electron beam dissemination also functions to provide an atmosphere in which impurities are readily removed from the melt. In order to do this the top puddle of the melt is maintained in a molten condition for a time interval sufficient to allow the purification required. The additives to the melt are either in the form of solid metal or droplets of previously melted materials. The ingot is then lowered progressively as the top puddle fills to form an elongate ingot.

One of the difficulties encountered in this type of process is that the surfaced exposure of the top melt is sufficiently limited so that a relatively great amount of time is required to allow full evaporation. The geometry of the aforesaid system also adds some difficulty in feeding, and when feeding is accomplished, many times undesirable splashing occurs due to the fact that molten drops or solid particles usually fall a considerable distance prior to engaging the melt.

It is the object of the present invention to provide a novel method of and means for flowing molten refractory metals from one mold to another in which the metal is heated by electron beam bombardment during its flow between molds. The flowing between molds has the advantage of providing a relatively broad exposed surface area which will allow for more rapid and efficient volatization and evaporization of the impurities carried within the refractory metals.

The aforesaid has the feature and advantage of allowing the metal to be heated in one melt and flowed into another melt at a controlled rate without splashing.

In melting and casting in a high vacuum furnace a great deal of energy must be applied to the metal to convert it from a solid to a liquid state. Thereafter, the energy level required to maintain the fluid metal in a fluid condition is somewhat less. However, the liquid material must expose a relatively large surface area in order to get fully efficient evaporation of the more volatile impurities. In the present invention provision is made wherein a small crucible can be employed to create the initial melt. The limited size of the crucible allows a higher concentration of energy to be applied for the conversion of the solid metal to a liquid state. Thereafter, the metal can be flowed to a larger crucible where evaporation of the more volatile metals can occur. In this way the advantages of a relatively small or concentrated melt area can be obtained and at the same time the advantages of a relatively large surface area can be effected.

The invention further incorporates a mold form with a depending lip forming a receiving area for newly added material whether it be solid metal form or molten metal from an adjacent melt. By virtue of the flange structure much of the splashing normally encountered by top feeding can be eliminated.

Another object of the invention is to provide a mold system in which the metal melted within a melt can be flowed in a trough-like arrangement and fed into a casting mold formed in a configuration adapted for some end use. In such a configuration the purification of the metal occurs while it is flowing from the primary melt to the casting mold in the trough in which heat is applied to the metal during its transitory or mobile life.

Another feature and advantage of the invention is that the molds or melts can be of a form commonly employed in the drip melting techniques heretofore employed, by which a starting stub or ingot is provided at the top of the mold or melt and is gradually lowered as the material is added at the top. In the present invention, however, the reversed process in the case of the melting mold will allow the top of the melting mold to progressively melt and flow the material into the casting mold, wherein the lowering of the ingot in the casting mold will continually provide space to receive continued addition of molten material. It is believed that the aforesaid system would allow a more rapid melting with consequent purification due to the relatively large surface exposure of the material while it is being transferred from the melting to the casting molds.

Another object of the invention lies in the fact that the molds can be cascaded with the addition of more than two molds within a single electron beam furnace, whereby the material in the first mold is melted and flowed to a second mold, and thereafter again it overflows into a third mold. This structure could be employed where greater purification is required and in situations where the end or last mold is formed in a configuration which may be desired for end products such as in sheet, bar or round ingot.

Another feature of the invention lies in the fact that the novel techniques employed therein allow the metal to melt in a melting or receiving mold and be flowed to a second mold for purification and then back to the melting mold for subsequent final solidification or evaporation, in which purification is accomplished during the two phase push-pull type of casting and melting operation.

In the present invention it is possible to flow metal either alternatively or conjunctively to two or more molds either by the employment of weirs or by establishing predetermined levels of the entry and exit ports of the respective crucibles or molds. In this way the entry port can be located above the exit port. The working top level of the melt can be established below the exit port. Outflow can then be accomplished by either further addition of material to the melt or by raising the melt level as by actuating the piston at the bottom of the melt.

Another object and advantage of this invention lies in the fact that the system is readily adaptable to be energized by electron beam guns mounted either above or below material to be melted.

These and other objects, features and advantages will be more apparent after referring to the following specification and accompanying drawing in which:

FIG. 4 shows another embodiment of the invention adaptable for use with a plurality of melts.

FIG. 5 is a cross-sectional view showing details of a crucible for use with the present invention.

FIG. 6 is a diagrammatic view illustrating the use of melts or crucibles of different sizes and the use of adjustable weirs which are details in FIG. 7 to alternatively flow molten material from one to alternative other melts.

Figure 1:
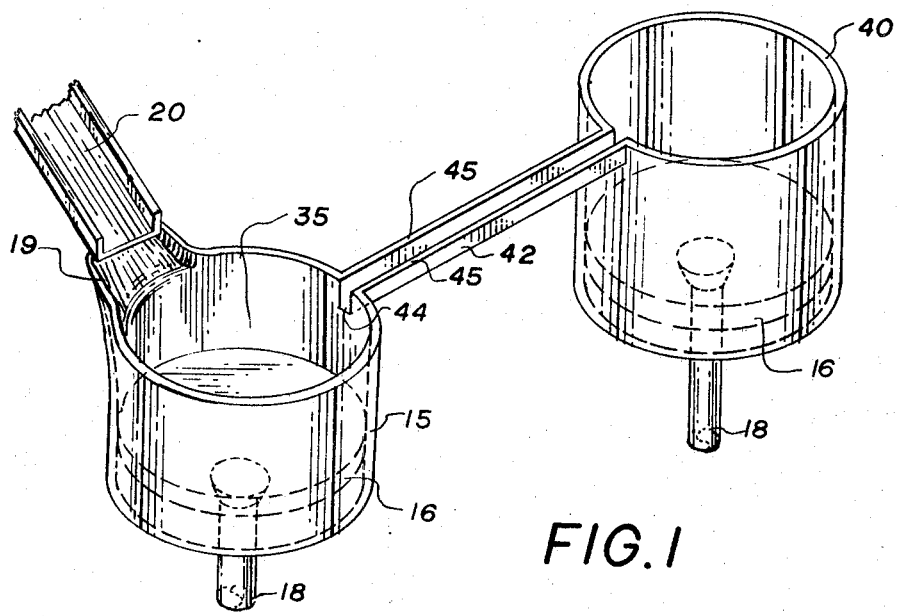
FIG. 1 is a perspective view showing the relationships of a plurality of melts contained within a single furnace embodying the present invention.

In FIG. 1 a crucible 15 is formed with a bottom plate 16 adapted to be moved upwardly by a push rod 18 which can be moved by a suitable reciprocating power source. The side wall of crucible 15 is formed on one side with a lip 19. A feed trough 20 is arranged over the lip 19 through which particles of metal can be fed into crucible 15. An airlock 22 is formed in the furnace housing 25 to allow material to be fed into trough 20 without disrupting the vacuum within the furnace.

Figure 2:
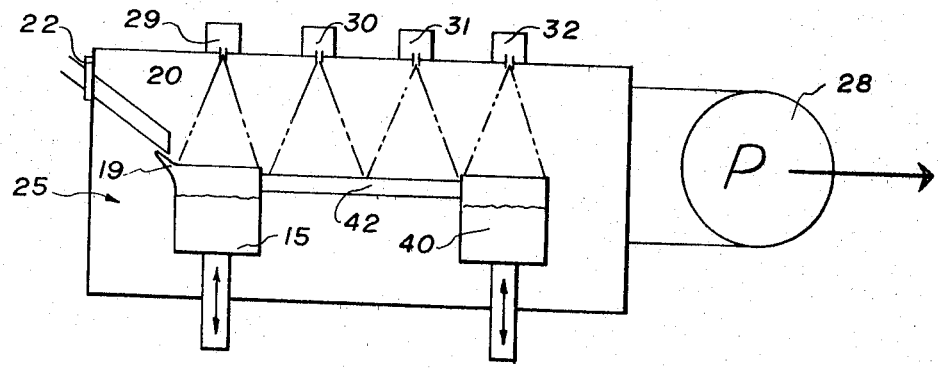
FIG. 2 is a schematic view showing the furnace housing and electron guns arranged to energize and heat the melts.

As can be seen in FIG. 2 the furnace 25 is provided with a suitable pump 28 of sufficient capacity to reduce the pressure within the furnace 25 to a sufficiently low value to allow electron beam flow from electron guns 29, 30, 31, and 32 to the respective crucibles and troughs within the furnace. Lip 19 functions as a receiving base to allow material flowed from the trough to fall into the melt 35 within crucible 15 in such a way as to minimize splashing as would occur if the material were to be dropped directly into the melt. As an additional feature lip 19 allows the feed trough to be located outside of the electron beam flow path to melt 35 so that trough 20 will not be unduly heated by electron bombardment.

As can be seen in FIG. 5, the walls of crucible 15 are water-cooled by water flow system 38. Other elements, such as bottom 16, can also be similarly cooled, as shown in FIG. 5, and as required. The specific cooling construction is not detailed in that the requirements vary with the furnaces and the type of material to be worked with.

A second crucible 40 is arranged near crucible 15. Crucible 40 is constructed in generally the same configuration as crucible 15, having a bottom piston 16 which is moved through a shaft 18. A trough 42 is arranged to extend between crucible 15 to crucible 40. The bottom 44 of the trough extends into the respective crucibles 15 and 40, so that its side walls 45 form a guide to allow molten metal to flow between the two crucibles. It can be seen in FIG. 2 that electron gun 29 is arranged to project an electron beam to the melt within crucible 15. Electron guns 30 and 31 are arranged to hit the interior of trough 42 and electron gun 32 is arranged to hit the melt in crucible 40.

In operation there are several alternative methods in which the aforesaid structure can be utilized. Crucible 15 may be prior to melting and evacuation of furnace 25 filled with either chunks of material 48, as indicated in FIG. 5, or, alternatively, may be filled with a solid ingot. The top of the material can then be melted by electron beam flow from gun 29 to form an upper melt 35. As the upper melt is formed, the piston or bottom 16 can be raised to a point where the melt will meet bottom 44 of trough 42 whereinafter the molten material will flow into crucible 40. Bottom 16 of crucible 40 can then be progressively lowered in order to accommodate increasing amounts of fluid material from trough 42. The speed of operation will determine the amount of evaporation of impurties occurring during the transfer of the fluid metal from melt 35 into crucible 40. It can be seen that the fluid material will exhibit a large surface area due to the heating occurred during its travel in trough 42 and will continuously be heated by gun 32 after the metal flows into crucible 40. Gradually the material at the bottom of crucible 40 will cool and solidify as its piston 16 is pulled downwardly. It can be seen that this method of melting allows the solid particles or ingot within crucible 15 to be melted at its top surface or melt 35 and thence to flow into its adjacent crucible 40 through trough 42 until finally a complete transfer of materials is effected. If further purification is needed the reverse action can occur by applying preliminary melting heat from electron gun 32 to remelt the top of the formed ingot in crucible 40 and to cause the ingot to melt and the metal to melt back through trough 42 into melt 35. It is noted in this connection that it is desirable to retain the trough in a substantially horizontal configuration in order to achieve the remelt characteristic above described.

Figure 3:
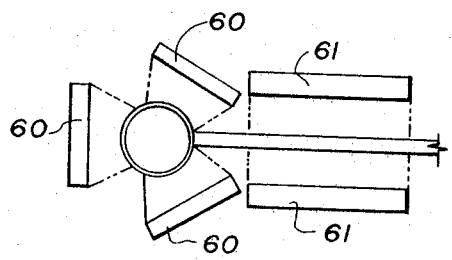
FIG. 3 is a schematic view showing an alternative gun arrangement.

As an alternative method of operation, powder or solid chips 56 can be flowed through trough 20 onto lip 19 and into crucible 15. The material is then melted in similar fashion by electron beam flow from gun 29, whereafter the material is flowed through trough 42 into crucible 40. In this mode of operation, melt 35 functions as a melt generating crucible where the metal is temporarily received and melted and thence flowed through trough 42 to mold crucible 40. The embodiment of FIG. 2 shows electron guns mounted above the crucibles and trough; however, as seen in FIG. 3, electron guns 60 can be mounted around the crucible to traject a curved beam upwardly and thence downwardly into the mold or crucible. This type of gun is commonly used in commercial practice and is arranged to accomplish the curved trajectory by virtue of magnetic fields in which the beam travels upwardly and thence down into the mold and affords considerable advantages with respect to shielding the gun from the upward ion discharge from the melts. Similar electron guns 61 can be mounted adjacent the trough to effect heating of the material within the trough in a manner similar to that discussed above in relation to FIG. 2.

In FIG. 4 the second mold crucible 65 can be formed with an outlet trough, as indicated at 68, in which the bottom of the outlet trough can be mounted either at the same level as the input trough 42 or could be located at a lower elevation, so that the melt within crucible 65 could be maintained and thence raised to the level of trough 68 for flowing to an additional crucible. Alternatively, as shown in FIG. 7, a weir 69 can be employed at 70 to close off trough 68, or can be mounted to close off trough 42 at 71. Such a weir may comprise simply a panel which is adapted to cause communication to the respective troughs, as indicated in FIG. 7. The employment of weir 69 can also be used in conjunction with a system schematically illustrated in FIG. 6, in which a crucible 80 is arranged with two troughs 81 and 82 extending therefrom. Two crucibles 83 and 84 are arranged at opposite ends of the two troughs 81 and 82, respectively. In this arrangement crucible 80 is formed of relatively small dimension so that initial melting can occur in the relatively small area of crucible 80. The initial melt requires more concentration of energy than is normally required to maintain the metal in a molten state. Because of this factor the metal can be flowed to the larger crucibles 83 and 84 which provide an enlarged surface area where the melt can be maintained molten for a predetermined time interval, and then allowed to cool, thereby forming a sufficient surface area to allow the impurities to boil off. The use of weirs 69, as shown in FIG. 7, at the entry to troughs 81 and 82 can allow the alternative or joint flow of metals from crucible 80 to the respective crucibles 83 and/or 84. In this way substantial control and flexibility of metal flow can be obtained.

It can thus be seen in the aforesaid invention that the facility of providing a trough flow between crucibles and maintaining the metal within the trough in heated condition during flow allows for great flexibility in melting and remelting of materials.

Although the foregoing invention has been described in some detail by way of illustration and example for

What is claimed is:

1. A method of melting metals within an electron beam furnace in which the metal in a vacuum is energized by electron beam flow to the metal, having the steps of forming a first area of metal, heating by electron bombardment the top portion of the metal in said first area to form a molten pool, raising the surface of said molten pool by reducing the volume of the bottom of the pool while maintaining the area of the top portion of the pool constant, limiting the raising of the surface of the pool to a point wherein the molten metal overflows its area, flowing the molten metal overflowing the first area in a substantially horizontal path to a second area, and solidifying said metal at said second area, and electron bombarding the metal during flowing from the first to the second area from the surface area of the pool only.

2. A method of melting metals in accordance with claim 1 and wherein the top surface of the second area is progressively lowered to receive additional molten metal.

3. An apparatus for melting metal within an evacuated electron beam furnace comprising within the furnace a first crucible, an opening formed in said first crucible below the top edge thereof, a trough open at one end to the opening and extending from said crucible in substantially horizontal alignment, a second crucible mounted at the opposite end of and opening to said trough, electron gun means to create electron bombardment to said first crucible and to said trough to maintain metal at the top of said first crucible and in said trough in molten condition, said first crucible being formed by side walls and a bottom reciprocally movable with respect to said side walls in a vertical axis, and means to progressively raise said bottom to thereby raise the level of molten metal in said first crucible to thereby cause overflow to said trough.

4. An apparatus for melting metal within an evacuated electron beam furnace comprising within the furnace a first crucible formed by side walls and a bottom member vertically, reciprocally movable in said side walls, an opening formed in the upper portion of the side wall of said first crucible below the top edge thereof, a trough open at one end to the opening and extending from said crucible in substantially horizontal alignment, a second crucible mounted at the opposite end of and opening to said trough, electron gun means to create electron bombardment to said first crucible and to said trough to maintain metal at the top of said first crucible and in said trough in molten condition, means to progressively raise the bottom of said first crucible to position the level of molten metal in said first crucible to cause overflow to said trough, and means to lower the top level of metal in said second crucible to allow the area for continuous receipt of metal therein from said trough.

5. An apparatus for melting metals in accordance with claim 4 and wherein said means for lowering the fluid level in said second crucible comprises said second crucible being formed with a vertically, reciprocally movable bottom and means for lowering said bottom.

6. An apparatus for melting metals in accordance with claim 4 and wherein said means for lowering the top level of fluid in said second crucible comprises said second crucible being formed with a vertically, reciprocally movable bottom and means for lowering said bottom, and an overflow spout mounted on the top of the side walls of said second crucible adapted to carry the fluid away from said second crucible when the fluid in said crucible is above a predetermined elevation.

7. An apparatus for melting materials within an evacuated electron beam furnace comprising within the furnace a crucible, said crucible having a flange spout connected to the top of said crucible, extending outwardly and slightly upwardly therefrom, means to feed materials to said crucible at the upper extremity of said flange spout, electron gun means positioned to heat the materials within said crucible, a trough opening to said crucible, said trough being in substantially horizontal position, a second crucible positioned to receive molten material from said trough, and electron beam gun means positioned to heat the material in said trough while flowing between said first and second crucibles, said trough having a width substantially less than the width of said first and second crucibles and having a depth substantially less than said first and second crucibles, and means to position the bottom of said second crucible to such an elevation so as to raise the fluid level in said second crucible to a level approximating the level of the fluid in said trough.

8. An apparatus for melting metals within an evacuated furnace comprising within the furnace first and second crucibles, a trough connected to each of said crucibles, said trough opening to both said crucibles to allow fluid flow between said first and second crucibles through said trough, means to heat the top surface of metals within said trough and each said crucible, each of said crucibles being greater in depth than said trough, and means to move the bottom of each of said crucibles vertically to cause melted metal flow in a totally substantially horizontal path through said troughs and between said crucibles.

9. An apparatus for melting metals within an evacuated furnace comprising within the furnace first and second crucibles, a trough connected to each of said crucibles, said trough opening to both said crucibles to allow fluid flow between said first and second crucibles through said trough, means to heat the top surface of metals within said trough and each said crucible, each of said crucibles being greater in depth than said trough, and means to move the bottom of each of said crucibles vertically to cause melted metal flow in a totally substantially horizontal path through said troughs and between said crucibles, said first crucible being formed of smaller diameter than said second crucible.

References Cited by the Examiner
UNITED STATES PATENTS

| 1,759,228 | 5/1930 | Drake | 263—36 |
| 2,610,218 | 9/1952 | Lang | 266—33 |
| 2,655,289 | 10/1953 | Peal | 222—405 |
| 2,763,903 | 9/1956 | Herres | 22—214 |
| 2,950,570 | 8/1960 | Cowles et al. | 266—33 |
| 3,157,922 | 11/1964 | Gruber | 22—73 |
| 3,217,368 | 11/1965 | Pototschnigg | 22—79 |

J. SPENCER OVERHOLSER, *Primary Examiner.*

R. D. BALDWIN, *Assistant Examiner.*